May 22, 1928. Re. 16,969
M. K. ARMSTRONG
APPARATUS FOR MAKING PLASTER BOARD
Original Filed March 15, 1919 3 Sheets-Sheet 1
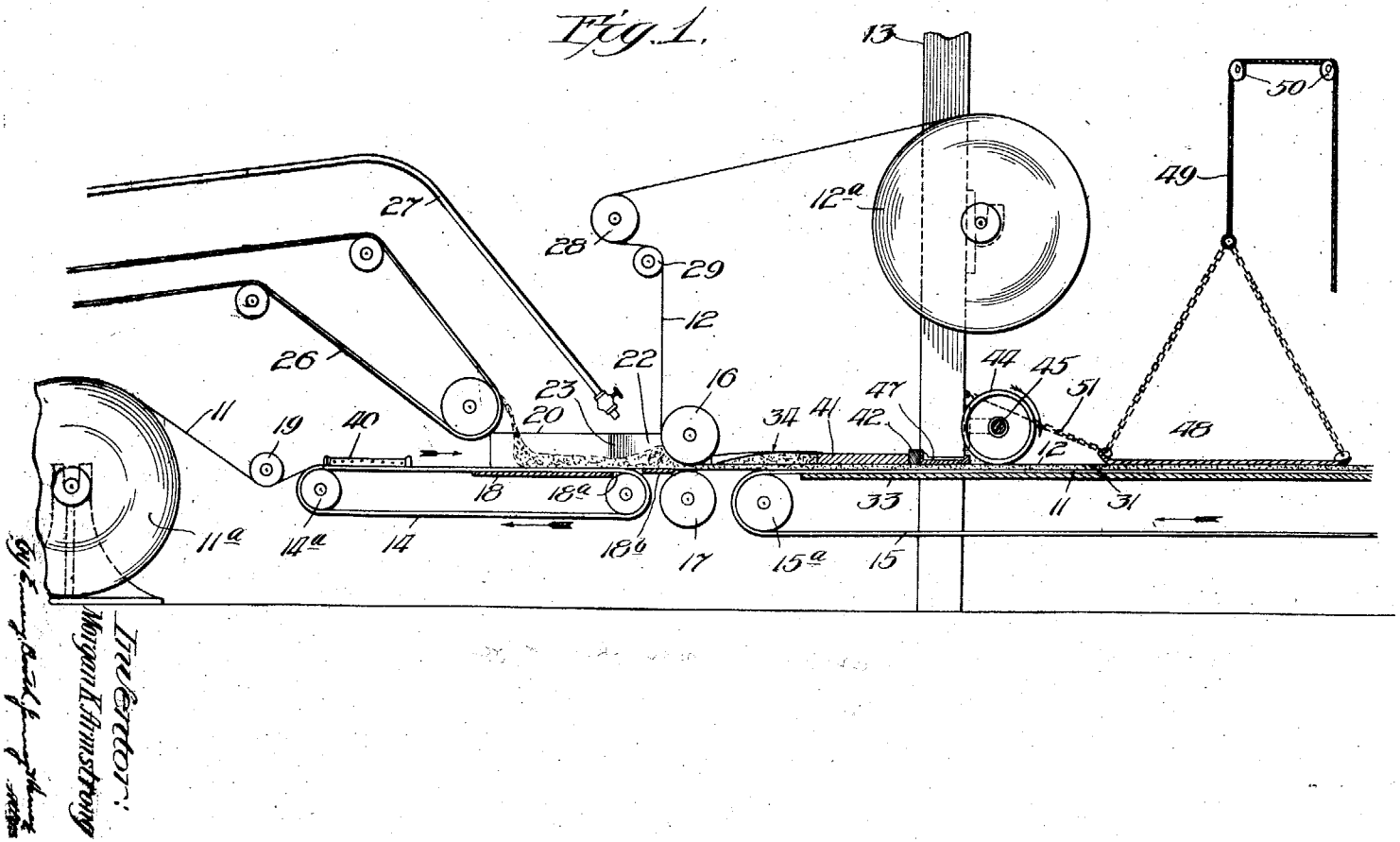

May 22, 1928. Re. 16,969
M. K. ARMSTRONG
APPARATUS FOR MAKING PLASTER BOARD
Original Filed March 15, 1919 3 Sheets-Sheet 2
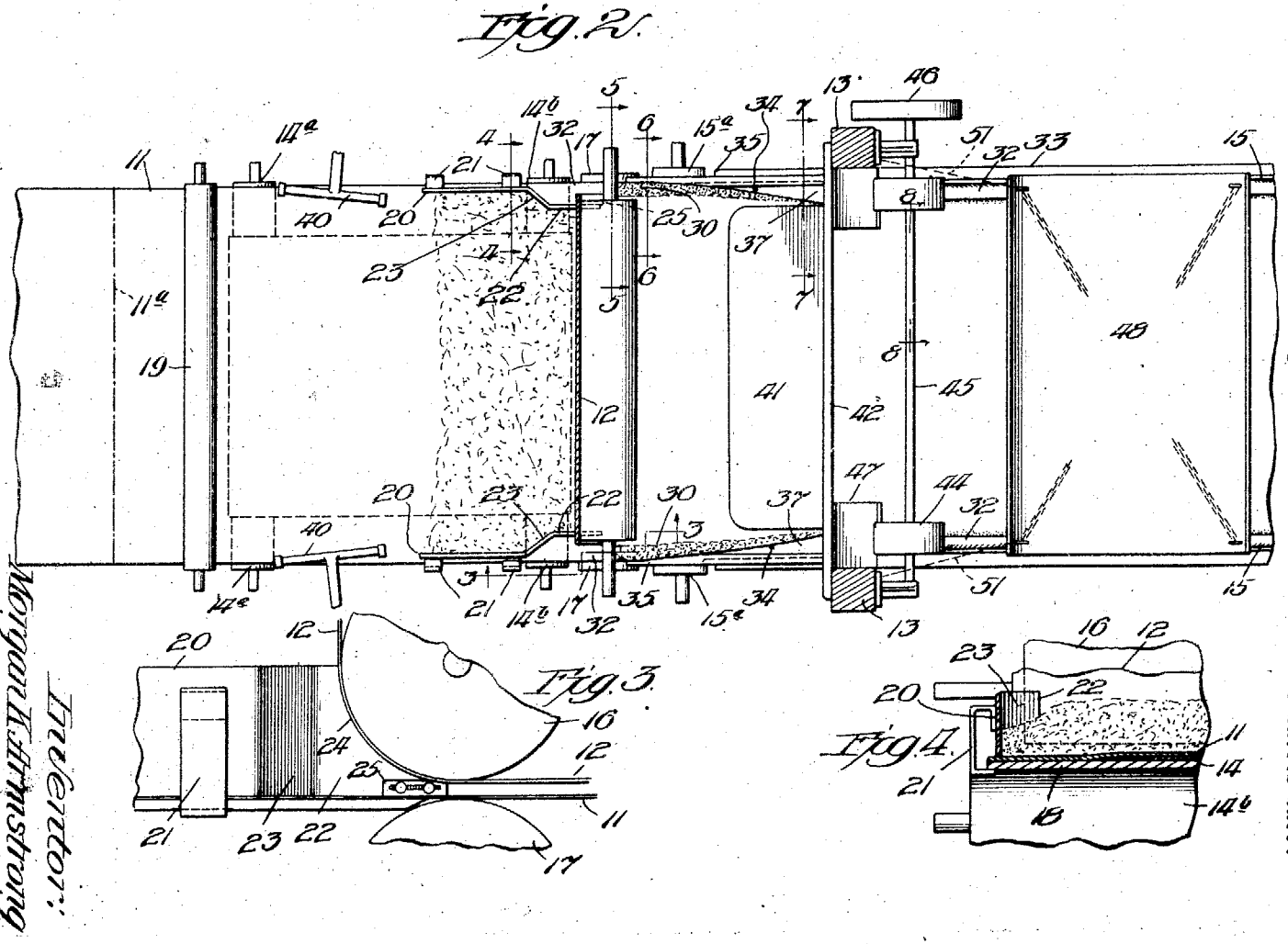
Inventor:
Morgan K. Armstrong
by Emery, Booth, Janney & Varney
Attys May 22, 1928. Re. 16,969
M. K. ARMSTRONG
APPARATUS FOR MAKING PLASTER BOARD
Original Filed March 15, 1919 3 Sheets-Sheet 3
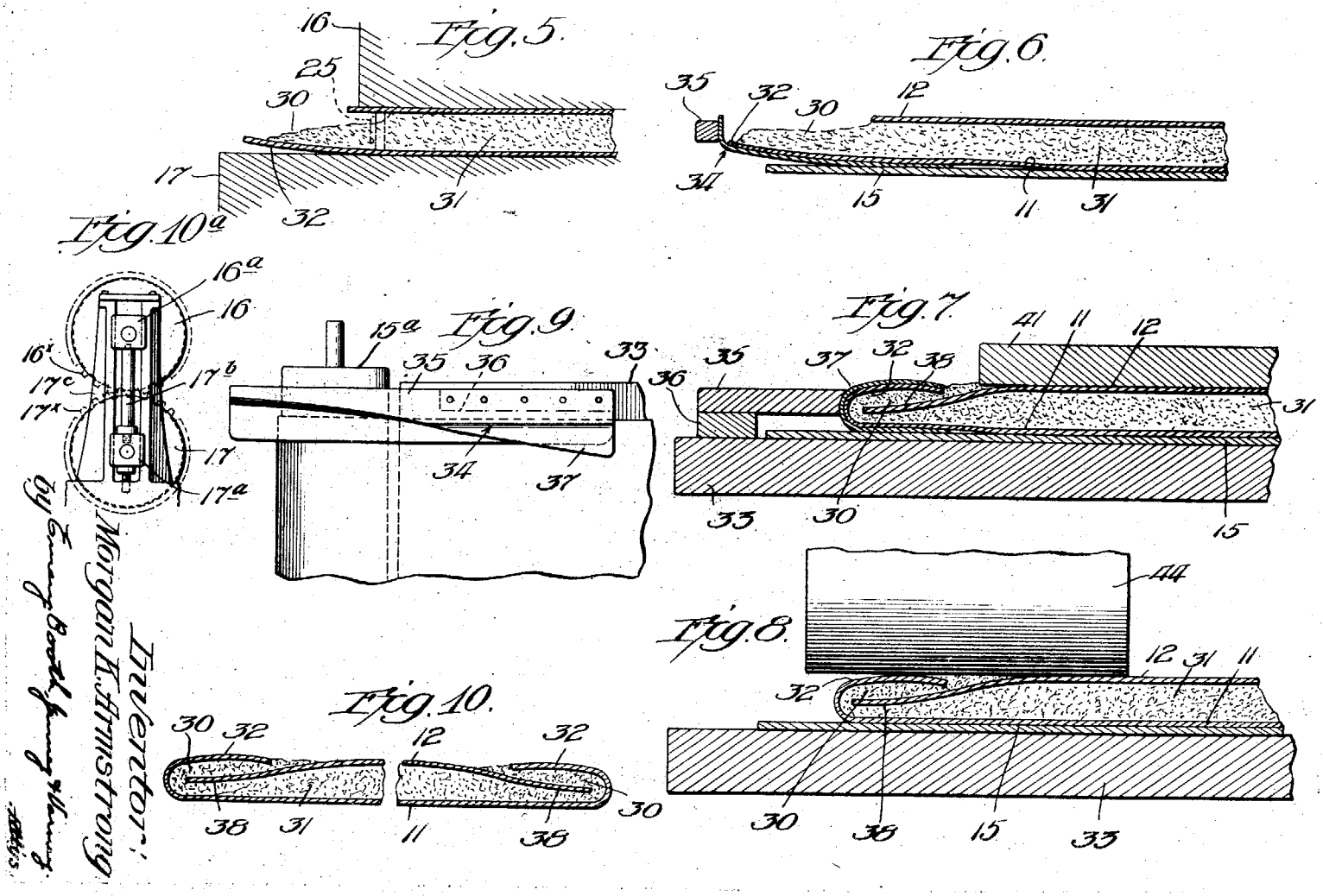
Inventor:
Morgan K. Armstrong
by Emery Booth Janney & Varney
Attys.

Reissued May 22, 1928. Re. 16,969

UNITED STATES PATENT OFFICE.

MORGAN K. ARMSTRONG, OF HAMPTON, VIRGINIA, ASSIGNOR, BY MESNE ASSIGNMENTS, TO UNITED STATES GYPSUM COMPANY.

APPARATUS FOR MAKING PLASTER BOARD.

Original application filed March 15, 1919, Serial No. 282,837. Divided and application filed July 12, 1919, Serial No. 310,471. Original No. 1,367,292, dated February 1, 1921. Application for reissue filed June 9, 1922. Serial No. 567,205.

This invention relates to improvements in apparatus for making plaster-board and consists of the matters hereinafter described and more particularly pointed out in the appended claims.

The disclosure of this application has been divided from application Serial No. 282,837, filed March 15, 1919, patented August 3, 1920, No. 1,348,387.

The object of the invention is to produce a simple and efficient apparatus which will make in a continuous bound edge strip, a plaster board consisting of top and bottom coverings of paper and of an intermediate layer of plastic material to which the said covering sheets adhere, the edges of the layer of plastic material being covered and the margins of the cover sheets cemented together in overlapping relation. The advantages of my improved apparatus for making such a plaster board, will more fully appear as I proceed with my specification.

The character of the invention may be best understood by reference to one illustrative apparatus embodying the invention and designed to make plaster board having one type of edge.

Such apparatus is illustrated in the accompanying drawings, in which:

Fig. 1 represents, diagrammatically, a longitudinal section through the apparatus.

Fig. 2 represents a top plan view of the apparatus.

Fig. 3 represents, on an enlarged scale, a section through Fig. 2, in a plane indicated by the line 3—3 of Fig. 2.

Fig. 4 represents a partial sectional view in a plane indicated by the line 4—4 of Fig. 2.

Fig. 5 represents, on a still larger scale, a partial transverse section through the apparatus, in a plane indicated by the line 5—5 of Fig. 2.

Fig. 6 represents a transverse section, in a plane indicated by the line 6—6 of Fig. 2.

Figs. 7 and 8 represent, respectively, transverse sections through the apparatus, in planes indicated by the lines 7—7 and 8—8 of Fig. 2.

Fig. 9 represents a top plan view of the bottom sheet edge-folding or turning horns.

Fig. 10 represents a transverse section through the finished board.

Fig. 10ª is an end elevation of the spreading rolls, illustrating the manner of mounting and operatively connecting them.

The illustrative apparatus is arranged to make a plaster board having a specific type of edge characterized by the overlapping of the margins of one sheet by the margins of the opposite sheet which fold over the edges of the body of plaster.

Referring now in detail to that embodiment of the invention illustrated in the accompanying drawings;—11 indicates the wider bottom covering sheet, and 12 indicates the narrower top covering sheet of the finished board. The respective widths of the sheets are determined by the dimensions of the plaster board and the particular type of plaster board edge. Each of these sheets is fed from a roll,—one of the rolls 11ª being mounted on a base or on the floor below the apparatus, and the other, 12ª, being mounted on suitable posts or uprights 13 rising at the sides of the apparatus. The bottom sheet 11, in its continuous advance through the apparatus, is supported by suitable endless belts 14 and 15, the first being located near the roll of paper 11ª and at the rear of the spreading rolls shortly to be referred to, and the other, 15, being located more remotely from the paper roll and in front of said spreading rolls.

The belt 14 is mounted on longitudinally spaced rolls 14ª and 14ᵇ, and the belt 15 on similarly spaced rolls 15ª and a second roll which is not shown in the drawings. Between the rolls 14ᵇ and 15ª, there are located a pair of spreading rolls 16 and 17 which are spaced apart a distance equal to the total thickness of the board to be made. The bottom roll 17 is located with its top surface in the plane of the top laps of the two belts 14 and 15. This roll is mounted in a fixed bearing, while the upper roll is mounted in vertically adjustable bearings, so that it is capable of a vertical adjustment to determine the thickness of the board. A familiar construction to provide this adjustment is shown in Fig. 10ª, wherein the rolls are shown with their shafts mounted in journal boxes $16^a$, $17^a$, respectively, and with a vertically adjustable rod $17^b$ interposed between the boxes. The boxes are mounted in pairs in an upright slotted standard $17^c$ and the rolls are operatively connected to be driven together by means of gears $16^x$, $17^x$, with long teeth, which permit the adjustment without disengagement.

At the rear of the spreading rolls is located a platform 18 which extends from the bottom spreading roll 17 to a space some distance to the rear of said roll. This platform 18 is located with its top surface in a plane tangential to the top of the roll 17 and is made wider transversely than the belt 14, the top lap of which passes through a transverse slot $18^a$ in the forward end of said board. (See Figs. 1 and 2.)

The bottom sheet thus advances from the supply roll $11^a$, over the top lap of the belt 14, over the part $18^b$ of the platform 18, forward of said belt, over the bottom spreading roll 17 and thence to the top lap of the belt 15. A tension roll 19 is preferably provided intermediate the belt 14 and the supply roll $11^a$.

At each side of the platform 18 and projecting into the space between the spreading rolls 16 and 17, are located mold boards 20, 20. Said mold boards determine the width of the plastic body to be included between the layers of paper, and extend parallel to each other in the direction of the feed of the paper. They are mounted with their bottom edges a distance above the top surface of the platform 18, sufficient to permit the thickness of the bottom sheet to pass underneath them, and are secured to said platform by means of overhanging brackets 21 attached to its edges.

The forward ends 22 of the mold boards 20 are offset inwardly, that is to say, toward each other, from the plane of the main length of said boards, said forward ends 22 being connected to said main lengths by means of inwardly inclined parts 23. The top edges of said forward ends 22 are curved, as indicated at 24, so that they may be made to closely engage the paper of the top sheet when it passes around the top roll, as will presently appear. Longitudinally adjustable plates 25 are attached to the outer faces of the forward ends of said mold boards. The forward ends of the mold boards themselves terminate, preferably, considerably to the rear of the diametric vertical plane common to the spreading rolls 16 and 17. The plates 25 may be adjusted to more closely approach the said diametric plane, but as will appear later, these plates are never to be brought into a position forward of said diametric plane.

The plastic mix is discharged upon the advancing bottom sheet 11 by means of a belt conveyer 26 suitably supported above the platform 18 from a hopper (not shown). A water pipe 27 is arranged to discharge water upon the plastic mix on the bottom sheet, in case more water is required than has already been put into the mix when it is delivered to the belt conveyer.

Operatives on either side of the apparatus mix and roughly spread the plastic mixture over the bottom sheet and remove any hard particles that may have set and have become detached from the mold boards, after first adhering thereto. As the bottom sheet advances toward the spreading rolls, the plastic mix is crowded toward the center and is edged up by the mold boards and is dammed up against the spreading rolls, at the same time leaving the marginal parts of the bottom sheet, which project beyond the mold boards, free of the plastic mix.

The top sheet 12 is fed from its supply roll $12^a$ and then about tension rolls 28, 29, and then downwardly and forwardly about the upper spreading roll 16. The upper spreading roll 16 is shorter (see Fig. 2) than the bottom spreading roll and is somewhat shorter than the width of the top sheet, but extends at each end beyond the planes of the front ends of the mold boards. After the top sheet is applied, the plastic body is spread evenly as it passes with the top sheet and the bottom sheet between the spreading rolls, so that as the three parts comprising the board approach the common vertical diametric plane of the spreading rolls, the board is in the form of a bottom sheet having marginal parts on which there is no plastic material, extending beyond a plastic body on said sheet, and with a top sheet applied to said plastic body having its edges projecting slightly beyond the same. Since the plates 25 do not project into the common diametric plane of the spreading rolls, where the distance between the rolls is least, but terminates short of said plane, a little of the plastic mixture will be spread out (as the board passes beyond the ends of the mold boards) over the marginal parts of the bottom sheet, (as shown in Fig. 5), the escaping plaster being indicated by the numeral 30 and the main body of the plaster being indicated by the numeral 31. By having the top roll 16 somewhat shorter than the width of the top sheet, the plastic mix is prevented from collecting on the ends of said roll and hardening thereon.

The final folding operations take place after both cover sheets have been applied and the plaster spread to a uniform depth.

After the board passes the spreading rolls, the marginal parts of the bottom sheet (which will hereinafter be referred to by the numeral 32,) with the small amount of plaster spread out thereon, are turned over to embrace the top sheet by means of folding devices or horns conforming in shape to the desired contour of the plaster board edge.

A table 33 is located forward of the roll 15a (which supports the rear loop of the endless belt 15) with its surface in supporting engagement with the top lap of the belt 15. Said table is wider transversely than the belt, and is somewhat wider than the bottom sheet of the plaster board. At each side of said plaster board are mounted folding horns 34 of familiar construction, said horns at their rear ends being substantially of the cross section shown in Fig. 6, and at their front ends being of the section shown in Fig. 7. Said horns are mounted on an overhanging block 35 attached to longitudinal strips 36 fixed at the sides of the board 33. The front end of each horn, as will be seen, has its turned-over part 37 bent so that it is somewhat inclined from the outer edges of the board to and below the horizontal, as clearly shown in Fig. 7. As the board is drawn forward, the marginal parts 32 of the bottom sheet are caught by the rear ends of the horns and said parts 32 with the plaster 30 are bent or turned over upon the top sheet, the several successive steps of the turning process being indicated in Figs. 5, 6 and 7.

The turning over of the marginal parts 32 with the plaster thereon, acts to depress the marginal parts 38 of the top sheet, as clearly shown in Fig. 7, thus leaving a substantial body of plaster between the adjacent parts of the top sheet and of the turned over margins of the bottom sheet.

In order to facilitate this turning over of the bottom sheet, I provide means for softening the marginal parts of the bottom sheet preliminarily to their reaching the folding horns,—this because since the paper is sized and stiff, it will not readily accommodate itself to the action of the folding horns unless treated in some such manner. To this end I provide in a position near the rear end of the platform 18, steam pipes 40 which are adapted to discharge jets of steam on said marginal edges and thus soften them.

To prevent buckling or bending upward of the plaster board or of the top sheet of the plaster board, during the action of the folding horns, an anti-buckling plate 41, which is narrower than the top sheet 12, is placed to bear on the top of the plaster board, said plate simply resting by its weight on the top sheet and being prevented from moving forwardly with the advancing plaster board by means of a bar 42 which extends outwardly beyond the platform 33 and is engaged against the upright posts 13.

As the plaster board passes beyond the folding horns, there is apt to be a slight excess of plaster at the edges of the turned-over marginal parts of the bottom sheet (see Fig. 7). To remove this plaster and to smooth down any that remains in this position, I provide narrow rolls 44, one or more for each margin of the board. Said rolls are mounted on a shaft 45 to the end of which is attached a pulley 46. This pulley is connected up to drive the rolls 44 in a direction opposite to the advance of the board so that they will in effect act as brushes to remove the excess plaster and to throw it rearwardly on trays or catch plates 47, located at the rear of said rolls and attached, as shown, to the bar 42. The rolls 44 are so located and are made of such a width with reference to the turned-over marginal parts of the bottom sheet of the plaster board, that each roll will extend beyond its associated edge of the board on one side, and beyond the space occupied by the plaster to be removed on the other side, in order to take care of the usual weaving of the paper, in the manufacture of the board.

After leaving the rolls 44, the board is passed under a weighted ironing or smoothing member 48. This is in the form of a plate which may be attached to cables 49 passing over pulleys 50, so that it may be lifted out of the road when threading the machine. Said ironing or smoothing member is wider than the plaster board, so that it extends beyond both edges of said board. It is prevented from advancing and moving forward with the board by means of chains 51 which are attached to the upright posts 13. The said ironing member, as the name applied to it suggests, irons out and smooths any wrinkles or buckles that appear or tend to form in the plaster board, and finally flattens the board and adheres the paper sheets to the plastic layer as the plastic layer approaches or reaches a set condition.

Although the apparatus above described was arranged for making a plaster board having a specific arrangement of cover sheet margins, it is obvious that it may be arranged to manufacture different types of plaster board edges by suitable adjustments. Obviously the invention is not limited to the particular details of construction of the illustrative apparatus. Moreover, it is not indispensable that all features of the invention be employed conjointly as they may be used to advantage in various combinations and sub-combinations.

I claim:

1. An apparatus for making plaster board of the kind described, comprising means for continuously advancing and supporting a bottom sheet, means for depositing a plastic mixture on said bottom sheet, vertically spaced spreading rolls interposed in the path of the advancing bottom sheet, one of said spreading rolls being adjustable with reference to the other to determine the space between them, and the other of said spreading rolls being in the plane in which said bottom sheet is advanced, means for feeding a top sheet about said adjustable spreading roll in a plane above the means supporting said bottom sheet, mold boards in advance of said spreading rolls spaced above the support for the bottom sheet sufficiently to permit the marginal edges of said bottom sheet to project beyond said mold boards, said mold boards being adapted for confining the plastic mixture disposed upon the advancing bottom sheet, said mold boards having ends adapted for engagement with the top spreading roll and having ends terminating short of the common vertical, diametric plane of said spreading rolls plates adjustable to extend into the space between said spreading rolls folding horns located at each side of the support for the bottom sheet, adapted for folding over the marginal parts of said bottom sheet, means coacting with the support for the bottom sheet to prevent buckling during the folding-over process of the bottom sheet, and an ironing device adapted to flatten the board and adhere the covering sheets to the plastic body in advancing the board.

2. An apparatus for making plaster board of the kind described, comprising means for continuously advancing a bottom sheet, means for depositing a plastic mixture on said sheet, mold boards spaced inwardly and above the marginal parts of said bottom sheet, to confine the plastic mixture on the middle of the sheet between said marginal parts which are left bare and exposed, vertically adjustable, spaced top and bottom spreading rolls, in the path of the advancing bottom sheet, means for feeding a narrower top sheet about the top spreading roll, said mold boards having ends adapted for engagement with the top roll, and terminating short of the vertical plane of said rolls, folding horns for turning over the marginal parts of the bottom sheet onto the margins of the narrower top sheet, after leaving the spreading rolls, and an ironing device for smoothing the product and adhering the top and bottom sheets to the plastic mixture.

3. An apparatus for making plaster board of the kind described, comprising means for continuously advancing a bottom sheet, means for depositing a plastic mixture on said sheet, mold boards spaced inwardly and above the marginal parts of said bottom sheet, to confine the plastic mixture on the middle of the sheet, between said marginal parts which are left bare and exposed, vertically adjustable, spaced top and bottom spreading rolls, in the path of the advancing bottom sheet, means for feeding a narrower top sheet about the top spreading roll, said mold boards having ends adapted for engagement with the top roll, and terminating short of the vertical plane of said rolls, folding horns for turning over the marginal parts of the bottom sheet onto the marginal parts of the narrower top sheet, after leaving the spreading rolls, means supporting said top and bottom sheets with the plastic mixture between them, after they have passed the spreading rolls, a device coacting with said supporting means and engaging the top sheet between said folding horns for preventing buckling of the product under the action of the folding horns, and an ironing device for smoothing the product and adhering the top and bottom sheets to the plastic mixture.

4. An apparatus for making plaster board of the kind described, comprising means for continuously advancing a bottom sheet, means for softening the marginal parts of said bottom sheet, means for depositing a plastic mixture on said sheet, mold boards spaced inwardly and above the marginal parts of said bottom sheet, to confine the plastic mixture on the middle of the sheet between said marginal parts which are left bare and exposed, vertically adjustable, spaced top and bottom spreading rolls, in the path of the advancing bottom sheet, means for feeding a narrower top sheet about the top spreading roll, said mold boards having ends adapted for engagement with the top roll, and terminating short of the vertical plane of said rolls, folding horns for turning over the marginal parts of the bottom sheet onto the margins of the narrower top sheet, after leaving the spreading rolls, and an ironing device for smoothing the product and adhering the top and bottom sheets to the plastic mixture.

5. An apparatus for making plaster board of the kind described, comprising means for continuously advancing a bottom sheet, means for depositing a plastic mixture on said sheet, mold boards spaced inwardly of the marginal parts of said bottom sheet, to confine the plastic mixture between said marginal parts which are left bare and exposed, spaced spreading rolls in the path of the advancing bottom sheet, means for feeding a narrower top sheet between said rolls, said mold boards constructed and arranged to permit a small amount of plaster to flow upon the margins of said bottom sheet, and folding devices for turning over the marginal parts of the bottom sheet onto the margins of the narrower top sheet, after leaving the spreading rolls.

6. An apparatus for making plaster board of the kind described, comprising means for continuously advancing a bottom sheet, means for depositing a plastic mixture on said sheet, mold boards spaced inwardly of the marginal parts of said bottom sheet to confine the plastic mixture on the middle of the sheet between said marginal parts, spaced spreading rolls in the path of the advancing bottom sheet, means for feeding a narrower top sheet between said rolls, said mold boards having ends terminating short of the rolls and adjustable to vary the amount of plaster flowing upon the margins, folding devices for turning over the marginal parts of the bottom sheet onto the marginal parts of the narrower top sheet after leaving the spreading rolls, and wheels revolving in a direction opposed to the travel of the board for removing any excess plaster upon the top sheet adjacent the folded margins.

7. An apparatus for making plaster board of the kind described, comprising means for continuously advancing a bottom sheet, means for softening the marginal parts of said bottom sheet, means for depositing a plastic mixture on said sheet, means for confining the plastic mixture to the middle of the sheet leaving marginal parts which are substantially bare, spreading rolls, in the path of the advancing bottom sheet, means for feeding a top sheet between said rolls and folding devices for turning over the marginal parts of the bottom sheet onto the margins of the narrower top sheet.

8. In an apparatus for making plaster board, the combination of a conveyor for carrying and supporting a cover-sheet, means for depositing plastic material on the sheet, means for applying a second cover-sheet to the plastic material and for spreading said plastic material to form a board of uniform thickness, means for causing a small amount of plastic material to flow upon the margins of one sheet, and means located beyond said spreading means for folding the margins of the wider sheet into a plane substantially parallel with the other sheet so as to bring the corresponding margins of said sheets in superposed relation and cementing the same together with the small amount of plaster.

9. In an apparatus of the class described, the combination of a conveyor, means for supplying a sheet of covering material thereto, means for rendering the margins of said sheet more flexible so as to fold more readily, means for depositing plastic material upon said sheets, means for applying a second cover-sheet over said plastic material, and means for folding thereafter the margins of said first sheet into a plane substantially parallel to said second sheet so that the corresponding margins of said sheets are superposed.

10. In an apparatus for making plaster board, the combination of means for advancing a bottom cover-sheet, means for depositing plastic material on the sheet, means for supplying a top sheet to said plastic material, a pair of spaced spreading rolls between which said sheets and plaster pass, means for applying a small amount of plaster to the margins of one of said sheets, folding horns for folding said margins upon the margins of the other sheet and means for pressing said margins down upon said other margin.

11. In an apparatus for making plaster board, the combination of means for advancing a bottom cover-sheet, means for depositing plastic material on the sheet, means for supplying a top sheet to said plastic material, a pair of spaced spreading rolls between which said sheets and plaster pass, means for applying a small amount of plaster to the margins of the bottom sheet, folding horns for folding said margins upon the margins of the top sheet and means for cleaning off the top sheet adjacent the folded margins.

12. In an apparatus for making plaster board, the combination of means for advancing a bottom cover sheet, means for depositing plastic material on the sheet, means for supplying a top sheet to said plastic material, a pair of spaced spreading rolls between which said sheets and plastic material pass, means for folding said margins upon the margins of the top sheet and a device revolving in a direction opposed to the travel of the board for removing excess plaster from the top of the board.

MORGAN K. ARMSTRONG.